United States Patent
Range et al.

(10) Patent No.: US 10,467,547 B1
(45) Date of Patent: Nov. 5, 2019

(54) NORMALIZING TEXT ATTRIBUTES FOR MACHINE LEARNING MODELS

(71) Applicant: Amazon Technologies, Inc., Seattle, WA (US)

(72) Inventors: Gowda Dayananda Anjaneyapura Range, Redmond, WA (US); Rajeev Ramnarain Rastogi, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 1032 days.

(21) Appl. No.: 14/935,426

(22) Filed: Nov. 8, 2015

(51) Int. Cl.
*G06N 5/04* (2006.01)
*G06N 20/00* (2019.01)
*G06F 16/35* (2019.01)

(52) U.S. Cl.
CPC ............. *G06N 20/00* (2019.01); *G06F 16/35* (2019.01); *G06N 5/04* (2013.01)

(58) Field of Classification Search
None
See application file for complete search history.

(56) References Cited

U.S. PATENT DOCUMENTS

| | | | |
|---|---|---|---|
| 7,930,322 B2 | 4/2011 | MacLennan | |
| 2001/0027408 A1 | 10/2001 | Nakisa | |
| 2007/0244738 A1 | 10/2007 | Chowdhary et al. | |
| 2008/0077451 A1 | 3/2008 | Anthony et al. | |
| 2008/0097937 A1 | 4/2008 | Hadjarian | |
| 2009/0171662 A1 | 7/2009 | Huang et al. | |

OTHER PUBLICATIONS

Hüser, Forecasting Intracranial Hypertension Using Time Series and Waveform Features, Masters Thesis, ETH Zürich, 2015, pp. 1-78 (Year: 2015).*
U.S. Appl. No. 15/688,678, filed Aug. 28, 2017, Mohamed Thahir Peer Mohamed et al.
U.S. Appl. No. 15/182,366, filed Jun. 14, 2016, Robert Mark Waugh, et al.
U.S. Appl. No. 14/460,163, filed Aug. 14, 2014, Zuohua Zhang.
U.S. Appl. No. 14/489,448, filed Sep. 17, 2014, Leo Parker Dirac, et al.
U.S. Appl. No. 14/460,312, filed Aug. 14, 2014, Leo Parker Dirac, et al.
U.S. Appl. No. 14/318,880, filed Jun. 30, 2014, Leo Parker Dirac, et al.
U.S. Appl. No. 14/319,902, filed Jun. 30, 2014, Leo Parker Dirac, et al.

(Continued)

*Primary Examiner* — Wilbert L Starks
(74) *Attorney, Agent, or Firm* — Robert C. Kowert; Meyertons, Hood, Kivlin, Kowert & Goetzel, P.C.

(57) ABSTRACT

Respective correlation metrics between token groups of a particular text attribute of a data set and a prediction target attribute are computed. Based on the correlation metrics, a predictive token group list is created. For various observation records of the data set, values of a derived categorical attribute corresponding to the particular text attribute are determined based on matches between the particular text attribute value and the predictive token group list. A measure of the predictive utility of the particular text attribute is obtained using correlations between the categorical attribute and the prediction target attribute.

20 Claims, 10 Drawing Sheets

(56) References Cited

OTHER PUBLICATIONS

U.S. Appl. No. 14/460,314, filed Aug. 14, 2014, Leo Parker Dirac, et al.
U.S. Appl. No. 14/463,434, filed Aug. 19, 2014, Robert Matthias Steele, et al.
U.S. Appl. No. 14/569,458, filed Dec. 12, 2014, Leo Parker Dirac, et al.
U.S. Appl. No. 14/489,449, filed Sep. 17, 2014, Leo Parker Dirac, et al.
U.S. Appl. No. 14/484,201, filed Sep. 11, 2014, Michael Brueckner, et al.
U.S. Appl. No. 14/538,723, filed Nov. 11, 2014, Polly Po Yee Lee, et al.
U.S. Appl. No. 14/923,237, filed Oct. 26, 2015, Leo Parker Dirac, et al.
AWS, "Amazon Machine Learning Developer Guide", API, Apr. 9, 2015, pp. 1-133.

* cited by examiner https://<website>.com/textFieldInsights

Dear <customerName>,

The table below shows the relative utility of the top 5 text attributes of your data set <ds-name> in predicting the target attribute <targAttr>, based on our analysis of <100000> observation records. A higher predictive utility score means that the test attribute is a better predictor of <targAttr>. Click here to get details on how the score is computed. ← 805

| Text attribute name | Predictive utility score |
|---|---|
| Social media status update SMSU1 | 0.8 |
| Social media comment SMC1 | 0.7 |
| Text message TM1 | 0.65 |
| Email-to-friend EM1 | 0.5 |
| Email-to-family EM2 | 0.3 |

807

Within the most useful text attribute <SMSU1>, the following terms were correlated most strongly with <targAttr>. To see similar lists of highly-correlated terms for another attribute, change the attribute name below. ← 809

| Text attribute name: Social media status update SMSU1 |
|---|
| High-correlation terms: "channel1", "playerName1", "tournament", "tickets", "goal" |

NORMALIZING TEXT ATTRIBUTES FOR MACHINE LEARNING MODELS

BACKGROUND

Machine learning combines techniques from statistics and artificial intelligence to create algorithms that can learn from empirical data and generalize to solve problems in various domains such as natural language processing, financial fraud detection, terrorism threat level detection, human health diagnosis and the like. In recent years, more and more raw data that can potentially be utilized for machine learning models is being collected from a large variety of sources, such as sensors of various kinds, web server logs, social media services, financial transaction records, security cameras, and the like.

Observation records collected for training machine learning models may include values of a number of different types of attributes, such as numeric attributes, binary or Boolean attributes, categorical attributes and text attributes. The sizes of the data sets used for many machine learning applications, such as deep learning applications, can become quite large. Some machine learning data sets may include values for dozens or hundreds of attributes, and some text attributes may in turn contain hundreds or even thousands of individual words or tokens. A given data set may contain millions of observation records. In general, the time and resources required for training a given predictive model may increase with the data set size.

In order to help train a model to predict values of a target attribute, metrics indicating statistical relationships such as various measures of correlation may sometimes be computed between input attributes and the target attribute. For some types of non-text attributes (e.g., numeric, binary attributes, or categorical attributes), computing such metrics may be fairly straightforward, e.g., using pre-defined functions supported by various statistical software packages or tools. Using the metrics, data scientists or other users of machine learning systems may be able to distinguish between the particular non-text attributes which are superior candidates for inclusion as input parameters of a predictive model, and those non-text attributes which are not likely to be particularly helpful in predicting target attribute values. However, determining the relative predictive utility of text attributes may not be as straightforward, especially because values of a given text attribute may have very large (or widely varying) token counts, repeated tokens, and the like. As machine learning data sets incorporate more and more text-based data from social media applications, short message service (SMS) applications, e-mail and the like, the importance of identifying text attributes with superior predictive capabilities is only likely to increase.

BRIEF DESCRIPTION OF DRAWINGS

FIG. 8 illustrates an example programmatic interface which may be used to indicate predictive utilities of text attributes to clients, according to at least some embodiments.

Figure 1:
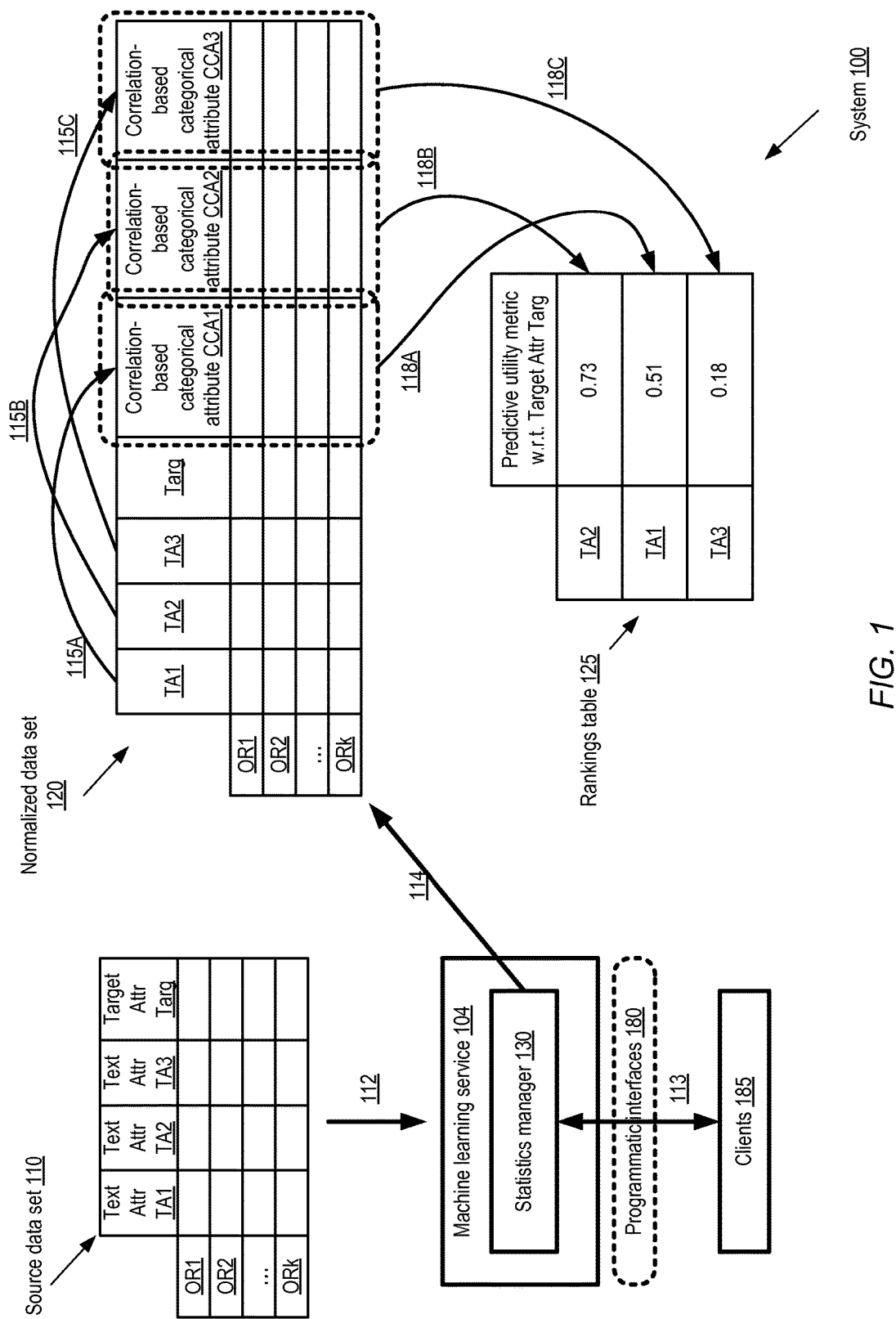
FIG. 1 illustrates an example system environment in which the relative predictive utility of different text attributes of a machine learning data set may be determined using derived categorical attributes, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for obtaining measures of the relative predictive utilities of the text attributes of machine learning data sets, using a technique which includes normalizing text attributes to corresponding categorical attributes, are described. At a high level, the algorithms described herein may help data scientists and/or other interested parties to distinguish between those text attributes of the data set which are more likely to be useful in predicting the value of a target attribute, and those text attributes which are less likely to be useful for predicting the value of the target attribute. The term "predictive utility", as used herein, refers to an estimate of the relative usefulness of different input attributes of a data set with respect to making predictions of target or output attribute value. At least in some embodiments, higher predictive utilities may correspond to greater accuracy of predictions made using the corresponding attributes. If a data set comprises input attributes Attr1, Attr2, Attr3, for example, and the respective predictive utilities of the three input attributes are 0.4 (for Attr1), 0.8 (for Attr2) and 0.2 (for Attr3), this would indicate that using Attr2 alone (or a value derived from Attr2) as an input variable for a predictive machine learning model would be likely to result in more accurate predictions than if Attr1 alone or Attr3 alone were used as input variables. In at least some embodiments, predictive utility metrics for text attributes may be based at least in part on correlation metrics computed between the target attribute and categorical attributes derived from the text attributes, as described below in further detail.

Especially if a data set contains a large number of text attributes, being able to identify some text attributes which can potentially be discarded (based on their low predictive utility) as input variables for a predictive model may help reduce the size of the training data, and thereby reduce the training time of the model. Furthermore, in many cases, at least a portion of the data set may be collectable from various data sources in continuous streaming mode, and being able to eliminate less useful text attributes may reduce the costs associated with collecting and storing the streaming data. Eliminating text attributes that are less helpful in making predictions may help reduce memory consumption and improve runtime performance of the predictive models, and may also reduce the probability of overfitting. In various embodiments, the text attribute normalization and/or predictive utility determination algorithms described herein may be implemented at a machine learning service of a provider network, e.g., as part of a data insights component of the machine learning service. In other embodiments, the algorithms may be executed using a standalone tool or an installable software module which is not necessarily part of a network-accessible machine learning service.

According to some embodiments, an input data set with numerous observation records containing text attributes and corresponding target attribute values may be processed in at least two phases or passes in order to obtain the predictive utility metrics or estimates. A set of one or more text attributes for which respective predictive utilities with respect to the target attribute are to be determined may be identified, e.g., in a preliminary stage prior to the first pass through the data set. During the first pass, the values of the text attributes may be parsed and cleansed—e.g., using some combination of tokenization (separation of a text string into individual words or tokens), punctuation removal, stemming, conversion to lower case (or upper case), and stop word removal. Respective correlation metrics between the individual tokens and the target attribute may be computed, e.g., by treating each individual token as a binary variable (with a "0" representing the absence of the token in a given observation record's text attribute, and a "1" representing the presence of the token, or vice versa) and measuring the correlations of the binary variables with the target attribute. In addition, during the first pass, respective occurrence counts or occurrence frequencies may be identified for each token—e.g., if a token Tok1 occurs 50 times in the data set, its occurrence count or frequency may be set to 50.

Using the first per-token correlation values and the occurrence counts, a respective predictive token list may be generated in the first pass for each text attribute in some embodiments. In one embodiment, a particular token may be included in the predictive token list only if its occurrence count exceeds a threshold (where the threshold may depend upon various factors, such as the total number of tokens or the total size of the data set). As a result of the frequency-based filtering, tokens which occur infrequently may be eliminated from further steps of the analysis. After the infrequent tokens have been excluded, the remaining tokens may be arranged in order of their respective correlations with the target attribute in some embodiments to form the predictive token list—e.g., the token with the highest correlation may be placed first in the list, and the token with the lowest correlation may be placed last. Any of a number of types of correlation metrics may be used in different embodiments: e.g., a symmetric uncertainty score may be used in some cases for binary or multi-class target attributes, while adjusted R-squared values may be used for numerical or regression-oriented target attributes. In some embodiments, only those tokens which meet some minimum correlation threshold with respect to the target attribute may be retained in the predictive tokens list. In one embodiment, the tokens in the predictive token list may be arranged in ascending order of correlation values rather than in descending order, or the list elements may be ordered independently of the correlation values. In at least one embodiment, instead of (or in addition to) determining correlations between individual tokens and the target attribute, correlations between groups of tokens (e.g., n-grams where n>1) and the target attribute may be computed, and a predictive token group list may be identified. To simplify the presentation, much of the following description assumes a token group size of one—e.g., correlations between individual tokens and the target attribute are assumed to be computed, and a predictive token list comprising individual tokens is assumed to be generated in the first pass of processing of the data set. At the end of the first pass, the respective predictive token lists (or predictive token group list) for each text attribute of interest may be available in various embodiments for use in the second pass through the data set. It is noted that in at least some embodiments, the first pass may not necessarily have to be completed for all text attributes before the second pass is begun for at least some text attributes—that is, there may be come overlap between the execution periods of the first and second passes.

In a second pass through the data set (or the cleansed version of the data set), the text attributes of the observation records may be examined to identify matches with the tokens of the corresponding predictive token list, and a categorical attribute value corresponding to a text attribute may be derived based on the matches. If, for example, a predictive token list contains tokens "Tok1", "Tok2" and "Tok3" in ordinal positions 1, 2 and 3 respectively, and a given text attribute value contains "Tok1" and "Tok3", a string "1_3" (or "1;3", or "1,3", or any similar string) indicating that the tokens in ordinal positions 1 and 3 matched the predictive token list may be created for the given text attribute value in one simple implementation. The string may then be converted to a categorical attribute. Similarly, using respective predictive token lists for the different text attributes, categorical attribute values corresponding to some or all text attributes of each observation record may be generated during the second pass. The process of generating the categorical attributes from the text attributes may be referred to as "normalizing" the text attributes. After the categorical attribute values have been generated, correlations between the categorical attributes and the target attribute may be computed in at least some embodiments. As in the case of the per-token or per-token-group correlation calculations of the first phase, any of a number of types of correlation metrics may be used for the categorical attributes in different embodiments: e.g., symmetric uncertainty or adjusted R-squared values may be used. The predictive utilities of the original text attributes may then be estimated or computed in various embodiments, based at least in part on the correlations of the respective categorical attributes derived from the original text attributes. In some embodiments, the correlations between the derived categorical attributed and the target attributes may be used directly (without modification) as measures of predictive utility. In other embodiments, the correlation values between the derived categorical attributes and the target attribute may be transformed to obtain the predictive utility measures—e.g., the correlation values may be grouped into buckets representing "high", "medium" and "low" predictive utility instead of using the absolute values of the correlation values. In effect, the derived categorical attributes may be used as correlation-based proxies or representations of the corresponding text attributes in the described algorithm, and a second level of correlation (between the proxies and the target attribute) may be computed to obtain the estimates of predictive utility.

The predictive utility measures for various text attributes may be presented to data scientists or other users of machine learning systems in various embodiments, and may help identify the set of attributes which should preferably be used as input variables for predictive models (e.g., regression models, binary classification models, or multi-class classification models). In some embodiments, models using attributes with high predictive utility may be generated automatically, e.g., at a machine learning service, after the data set is analyzed. In at least some embodiments, the analysis of predictive utility may be performed on a subset of observation records that are available (or become available over time, e.g., from a streaming data source). After the predictive utilities have been estimated or computed using the subset, a model may be trained using a training data set which includes at least some observation records which were not themselves analyzed for predictive utility determination. That is, in such embodiments, information about the relative usefulness of various text attributes may be determined using a sample of observation records, and then that information may help in the training of models using at least some un-sampled observation records. In other embodiments, the same set of observation records may be used to obtain the predictive utility measures and to train a predictive model.

A number of variations of the basic algorithm outlined above may be employed in different embodiments. For example, in one embodiment in which a large number of combinations of predictive tokens may be present in the data set, the members of a predictive token list (or predictive token group list) may be mapped to a bit vector, e.g., using a hash function, to reduce the total number of distinct values for a derived categorical attribute as described below. In some embodiments, categorical attribute values may be derived for numeric and/or binary variables, e.g., in addition to text attributes, so that respective predictive utility measures based on categorical attributes alone (either derived categorical attributes, or original categorical attributes of the data set) can be estimated or computed for all the different types of original or raw attributes of the data set. In at least one embodiment, statistical measures other than correlations alone may be used in one or both passes through the data set.

Example System Environment

FIG. 1 illustrates an example system environment in which the relative predictive utility of different text attributes of a machine learning data set may be determined using derived categorical attributes, according to at least some embodiments. System 100 includes a statistics manager 130 implemented using resources of a network-accessible machine learning service 104. The machine learning service 104 may implement one or more programmatic interfaces 180 (such as web-based consoles, application programming interfaces or APIs, command line tools, graphical user interfaces and like). Clients 185 of the machine learning service 104 may submit various types of requests to the service via the programmatic interfaces 180, and receive corresponding programmatic responses as indicated by arrow 113 in the depicted embodiment. A client 185 may, for example, submit a request to analyze a source data set 110 to determine various metrics, such as predictive utility measures corresponding to respective text attributes of the data set and a prediction target attribute.

Example source data set 110 includes numerous observation records (ORs), such as OR1, OR2, ORk. Each observation record contains respective values for text attributes TA1, TA2 and TA3, in addition to a prediction target attribute Targ. Targ itself, whose values may eventually have to be predicted for one or more test data sets using a machine learning model, may comprise any of several types of data in different embodiments—e.g., Targ may take binary or Boolean values, numeric values (e.g., discrete integer values, or real numbers), or multi-class categorical values. Only three example text attributes and the target attribute are shown in FIG. 1 to avoid clutter; generally speaking, the source data set may comprise any number of text attributes and any number of non-text attributes. In practice, a data set used for solving real-world machine learning problems may contain hundreds or even thousands of attributes (including numerous text attributes) and millions of observation records.

In the embodiment depicted in FIG. 1, the statistics manager 130 may examine the contents of the observation records of source data set 110, as indicated by arrow 112. The statistics manager 130 may produce a normalized data set 120 containing derived categorical attribute values corresponding to each of the text attributes TA1, TA2, and TA3, as indicated by arrow 114. For example, as indicated by arrows 115A —115C respectively, values of a first correlation-based categorical attribute CCA1 may be generated for TA1, values of a second correlation-based categorical attribute CCA2 may be generated for TA2, and values of a third correlation-based categorical attribute CCA3 may be generated for TA3. As described in greater detail below (e.g., in the context of FIG. 2, FIG. 4 and FIG. 5), generating the normalized data set 120 may require more than one pass or processing through the source data set 110 in various embodiments—e.g., one pass in which predictive token lists are created based on correlations computed between individual text tokens and the target attribute, and a second pass during which the categorical attribute values are derived using the predictive token lists. Generally speaking, in at least some embodiments, the respective values of the derived categorical attributes CCA1-CCA3 for a given observation record may incorporate information about the presence (or absence), in the observation record's TA1-TA3 attributes, of individual text tokens which are highly correlated with the target attribute Targ.

After the normalized data set 120 is obtained, the respective correlation between each of the derived categorical attributes CCA1-CCA3 and the target attribute Targ may be computed in the depicted embodiment. Either the correlation values themselves, or values derived at least in part from the correlation values, may then be provided to clients and/or stored as respective predictive utility measures for the corresponding text attributes. For example, as indicated by arrows 118A-118C, respective predictive utility values 0.73, 0.51 and 0.18 shown in rankings table 125 have been determined, using CCA2, CCA1 and CCA3, for text attributes TA2, TA1 and TA3 in the depicted embodiment. The example predictive utility rankings table 125 indicates that among the three text attributes TA1-TA3, the contents of TA2 are likely to be most useful in predicting values of Targ, while the contents of TA3 are likely to be least useful. In some embodiments, contents of the rankings table 125 may be provided via programmatic interfaces 180 to the client 185 on whose behalf the data set 110 was processed. The client 185 may use the results provided by statistics manager 130 as desired—e.g., either simply to gain greater insight into the data set 110, or to help design a predictive model for Targ1. In other embodiments, the contents of the rankings table 125 may be used to automatically select input variables to be used to train a predictive model (e.g., a regression model, a binary classification model, or a multi-class classification model, depending on the data type of Targ) within machine learning service 104. Results of such a predictive model may be provided programmatically to the client 185. Especially in scenarios in which the data set 110 includes large numbers of text attributes, the predictive utility rankings of the text variables may lead to decisions to discard some text attributes with low predictive utility from further consideration for predictive model inputs. For example, even in the trivial example shown in FIG. 1, the machine learning service 104 or a client 185 may decide that the benefit of using TA3 (or the corresponding categorical attribute CCA3) as an input variable of a predictive model is likely to be so low that TA3 (or attributes derived from TA3) can be excluded from the model's input variables. Eliminating such attributes may help, for example, to reduce the model training time or the resources required for training/executing the model.

In at least one embodiment, the approach illustrated in FIG. 1 may be generalized to cover non-text attributes as well as text attributes. For example, respective correlation-based categorical attributes may also be derived for numeric and binary attributes of an input data set. The normalized data set 120 may then comprise respective derived categorical attributes for text, numeric and binary attributes, as well as any original categorical attributes of the source data set. As a result of normalizing or converting numeric and binary attributes (as well as text attributes) to categorical attributes, a common correlation computation technique may be applied to determine the predictive utility measures of all the different attributes of the source data set, irrespective of the data types of the raw observation records. In embodiments in which such a generalized approach is used, all the attributes may be ranked in terms of predictive utility using similar statistical techniques, in effect creating a level playing field for comparison among all the different attributes. As a result, for example, it may be possible to discard a numeric attribute (with low predictive utility) from inclusion in the input variable set of a predictive model in favor of a text attribute which has a higher predictive utility, or to discard a text attribute in favor of a binary attribute or a numeric attribute with higher predictive utility, etc.

Overview and Example of Text Attribute Normalization Algorithm

Figure 2:
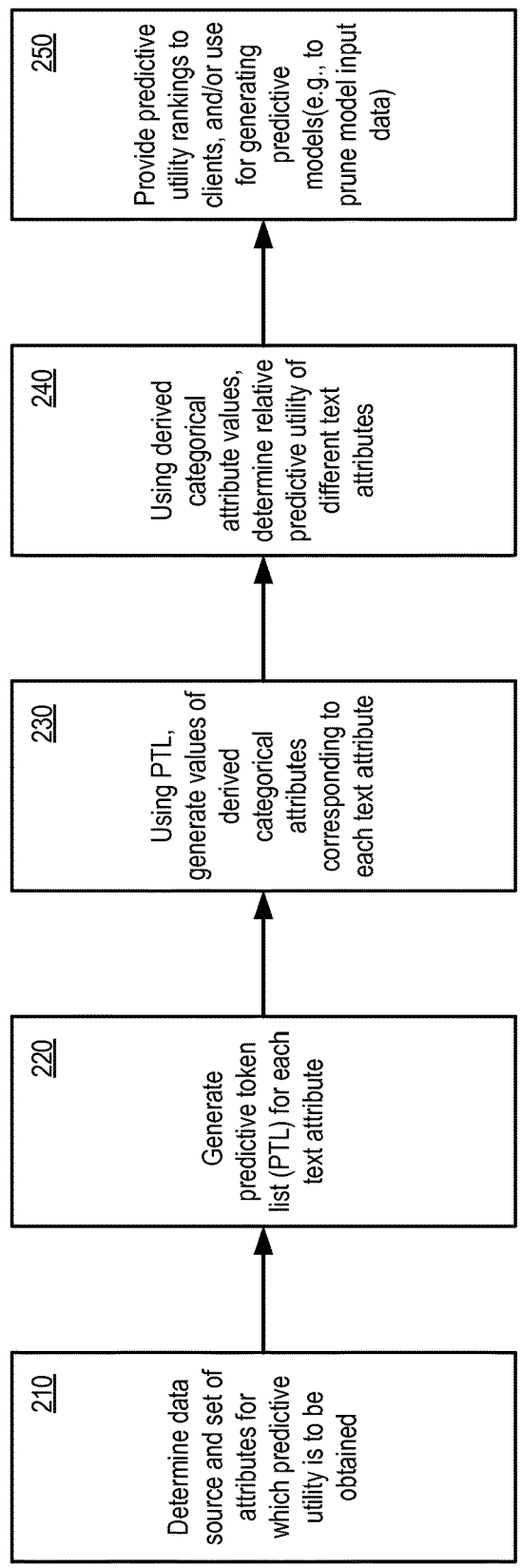
FIG. 2 illustrates a high-level overview of a normalization-based technique which may be used for identifying predictive utilities of text attributes of a data set, according to at least some embodiments.

FIG. 2 illustrates a high-level overview of a normalization-based technique which may be used for identifying predictive utilities of text attributes of a data set, according to at least some embodiments. As indicated in element 210 of FIG. 2, the data source from which observation records of the input data are to be obtained may be identified, and the set of text (and in some cases, non-text) attributes for which respective predictive utility measures with respect to a prediction target attribute are to be obtained may be identified as well. It is noted that although, in much of the remainder of this description, a single attribute is discussed as a prediction target, the techniques described may easily be extended to cover combinations of several prediction target attributes in various embodiments. In some embodiments, the normalization technique may be employed at a network-accessible machine learning service of the kind described below in the context of FIG. 7, and the data source and/or the attributes may be indicated by a client of the machine learning service, e.g., using programmatic interfaces exposed by the service. In other embodiments, information about the data source and attributes set may be provided to a standalone tool which may be executed at any desired computing device, e.g., without utilizing a machine learning service. Data sources of various kinds may be specified in different embodiments, such as pre-existing files, streaming data sources and the like. In one embodiment, the client may not specify the attributes for which predictive utility is to be determined; instead, the machine learning service component or the standalone tool may automatically identify at least the text attributes for which predictive utility is to be determined. In some embodiments, predictive utility may not necessarily be determined for all the text-based attributes of a data set. For example, some text attributes may already be expected (e.g., by the client) to be very useful for making predictions for the target attribute prior to the normalization, while the relative usefulness of other attributes may be in doubt. In some such scenarios, the relative predictive utility of only the in-doubt attributes may be determined.

As shown in element 220, a respective predictive token list (PTL) which includes text tokens that are expected to be most helpful in predicting the target attribute may be generated corresponding to each text attribute for which predictive utility is to be determined. Details of operations which may be performed to obtain the PTL are provided in FIG. 4 and discussed below. In various embodiments, the PTL may be generated after identifying correlations between individual text tokens (or groups such as pairs or triples of tokens) and the target attribute or attributes. The occurrence frequency or occurrence counts of the tokens may also be taken into account to generate the PTL in at least some embodiments. The PTL for a given text attribute may indicate the relative importance of different text tokens with respect to being able to predict the target attribute using the given text attribute. In various embodiments, the PTL may require a first pass through the observation records of the data set, and at least a second pass may be required for some operations of the remainder of the normalization procedure.

Using the predictive token lists, values of respective categorical attributes may be derived for each text attribute (element 230) in the next phase of the normalization technique in the depicted embodiment. The categorical attribute value for a given text attribute and a given observation record may indicate which of the tokens included in the PTL for the text attribute was present in the given observation record, for example. The generation of the categorical attributes may require a second pass through the data set in some embodiments. In other embodiments, some operations corresponding to element 220 may be performed in parallel with respect to operations corresponding to element 230. Details of the derivation of the categorical attributes are provided below in the context of FIG. 5.

As shown in element 240, the derived categorical attributes may be used to obtain estimates or values of predictive utility with respect to the target attribute, e.g., by computing any of various correlation metrics between the derived categorical attributes and the target attribute. The predictive utility values may then be provided to the clients on whose behalf the normalization technique was undertaken and/or to data scientists or other users of the machine learning service (element 250). In some embodiments, the set of input variables to be used to train a predictive model for the target attribute, such as a regression or classification model, may be determined using the predictive utility values. For example, attributes which have low predictive utility, or features/attributes which are derived from attributes with low predictive utility, may not be included as input variables.

Figure 3:
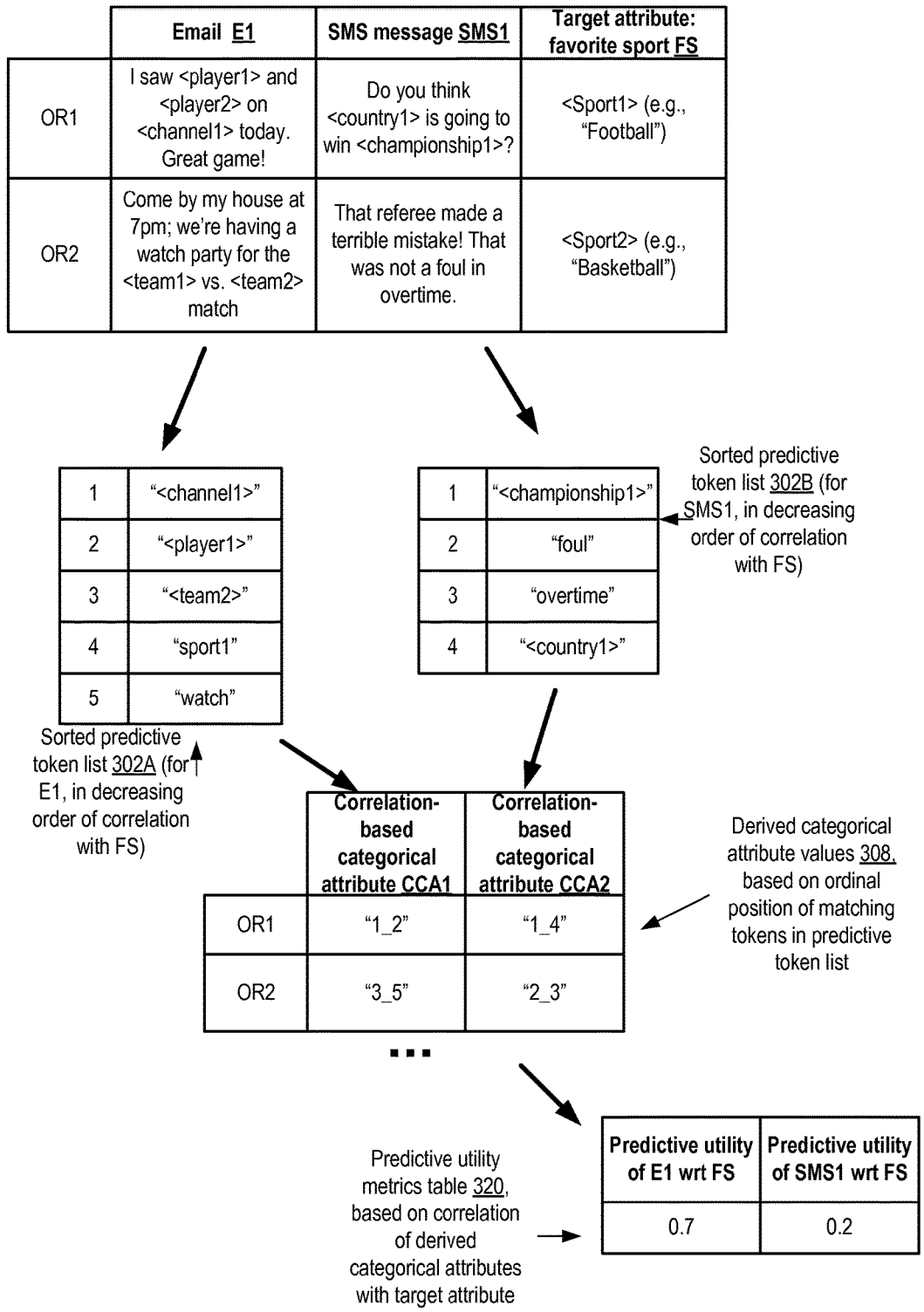
FIG. 3 illustrates a simple example of determining predictive utility for a data set in which the target attribute represents the favorite sports of individuals, and respective text attributes represent messages sent by the individuals, according to at least some embodiments.

FIG. 3 illustrates a simple example of determining predictive utility for a data set in which the target attribute represents the favorite sports of individuals, and respective text attributes represent messages sent by the individuals, according to at least some embodiments. Two observation records OR1 and OR2 of a data set are shown, with each OR containing respective values of an email attribute E1 and a short message service (SMS) message SMS1 generated by the individual whose favorite sport is indicated in the prediction target FS attribute. The data set may contain many more observation records than the two shown by way of example.

In operations corresponding to element 210 of FIG. 2, the text attributes E1 and SMS1 may be identified as the attributes for which respective predictive utility measures with respect to the target attribute FS are to be obtained. In operations corresponding to element 220, the individual tokens (e.g., words such as <player1>, <player2>, etc.) of the text attributes may be identified, and the correlation between each of the individual tokens and the target attribute FS may be computed in the depicted example. The tokens may then be sorted in decreasing order of correlation, and respective sorted predictive token lists 302A and 302B may be prepared for each of the text attributes. (In the example shown, it is assumed that all the tokens included in lists 302A and 302B meet respective occurrence frequency criteria—that is, that each of the words shown in list 302A occurs at least N1 times in the data set, and that each of the words shown in list 302A occurs at least N2 times, where N1 and N2 may be tunable parameters of the tool or machine learning service being used.)

The order of the words in sorted predictive token list 302A indicates that the token "<channel1>" of attribute E1 has the highest correlation with respect to the favorite sport, while the token "watch" has the lowest correlation among the listed words. Similarly, with respect to attribute SMS1, token list 302B indicates that the token "<championship1>" correlates highly with the favorite sport, while "<country1>" has a lower correlation.

The ordinal positions within the sorted lists 302 of the different words may be used to generate the correlation-based categorical attribute values CCA1 and CCA2 in the depicted example, e.g., in operations corresponding to element 230 of FIG. 2. For example, the E1 content "I saw <player1> and <player2> on <channel1> today. Great game!" of OR1 contains tokens "<channel1>" (in ordinal position 1 in list 302A) and "<player1>" (in ordinal position 2 in list 302A), so a categorical attribute value "1_2" may be generated corresponding to the respective ordinal positions of the matching attributes. Similarly, because the matching tokens "foul" and "overtime" occur in ordinal positions 2 and 3 in list 302B and in OR2's SMS1 value, the CCA2 value for OR2 is set to "2_3". After the CCA1 and CCA2 values are determined for all the observation records and text attributes, correlations between the CCA values and the target attribute FS may be computed in the depicted example, corresponding to element 240 of FIG. 2. These correlation values may be used as predictive utility measures for E1 and SMS1, as indicated in table 320. The predictive utility measures may be provided to the client on whose behalf the normalization was performed, and/or may be used to select input variables for predictive models generated to predict the target attribute FS.

Generating Predictive Token Group Lists

Figure 4:
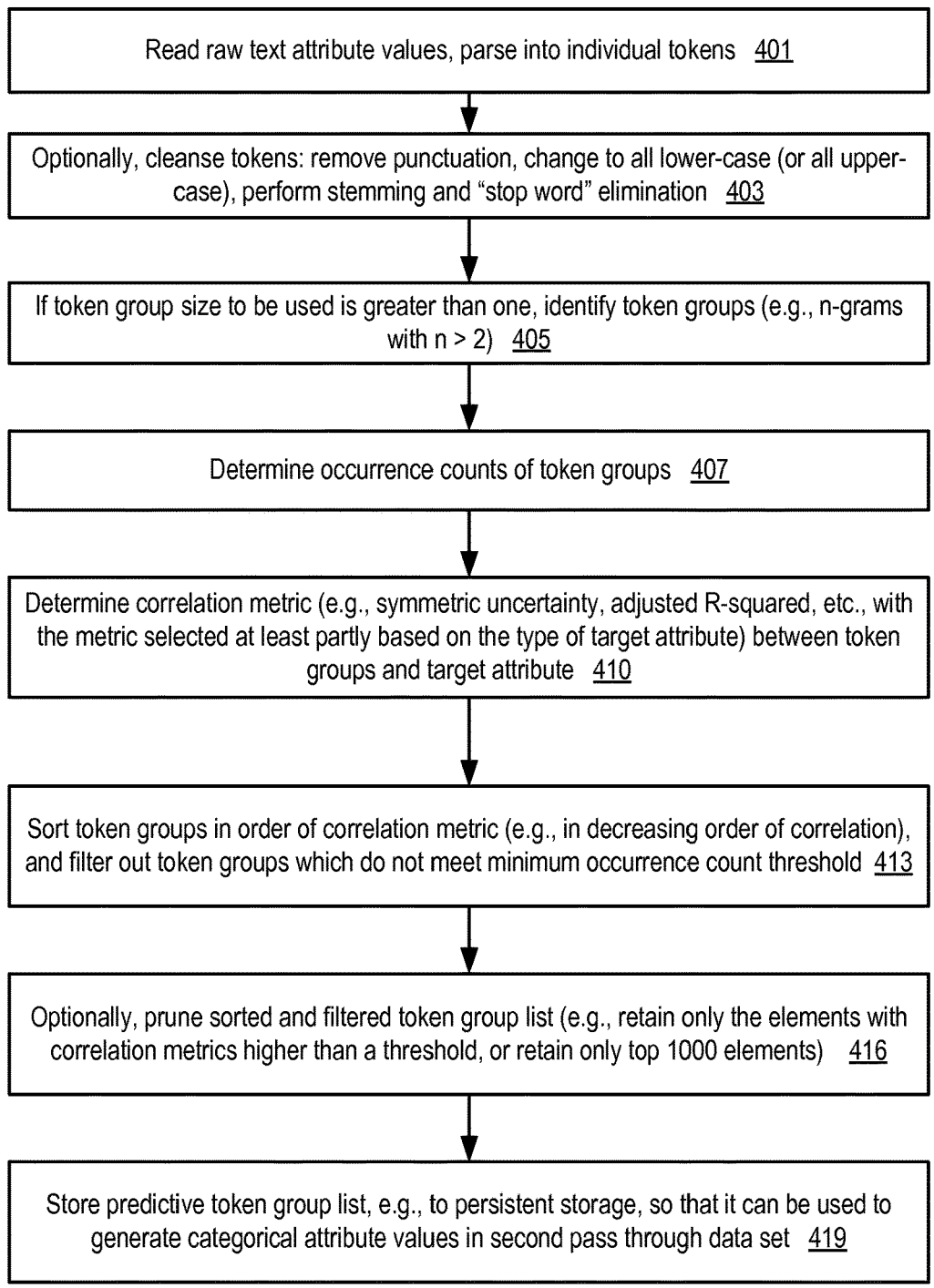
FIG. 4 is a flow diagram illustrating aspects of operations that may be performed to generate a predictive list of token groups corresponding to text attributes of a data set, according to at least some embodiments.
Figure 5:
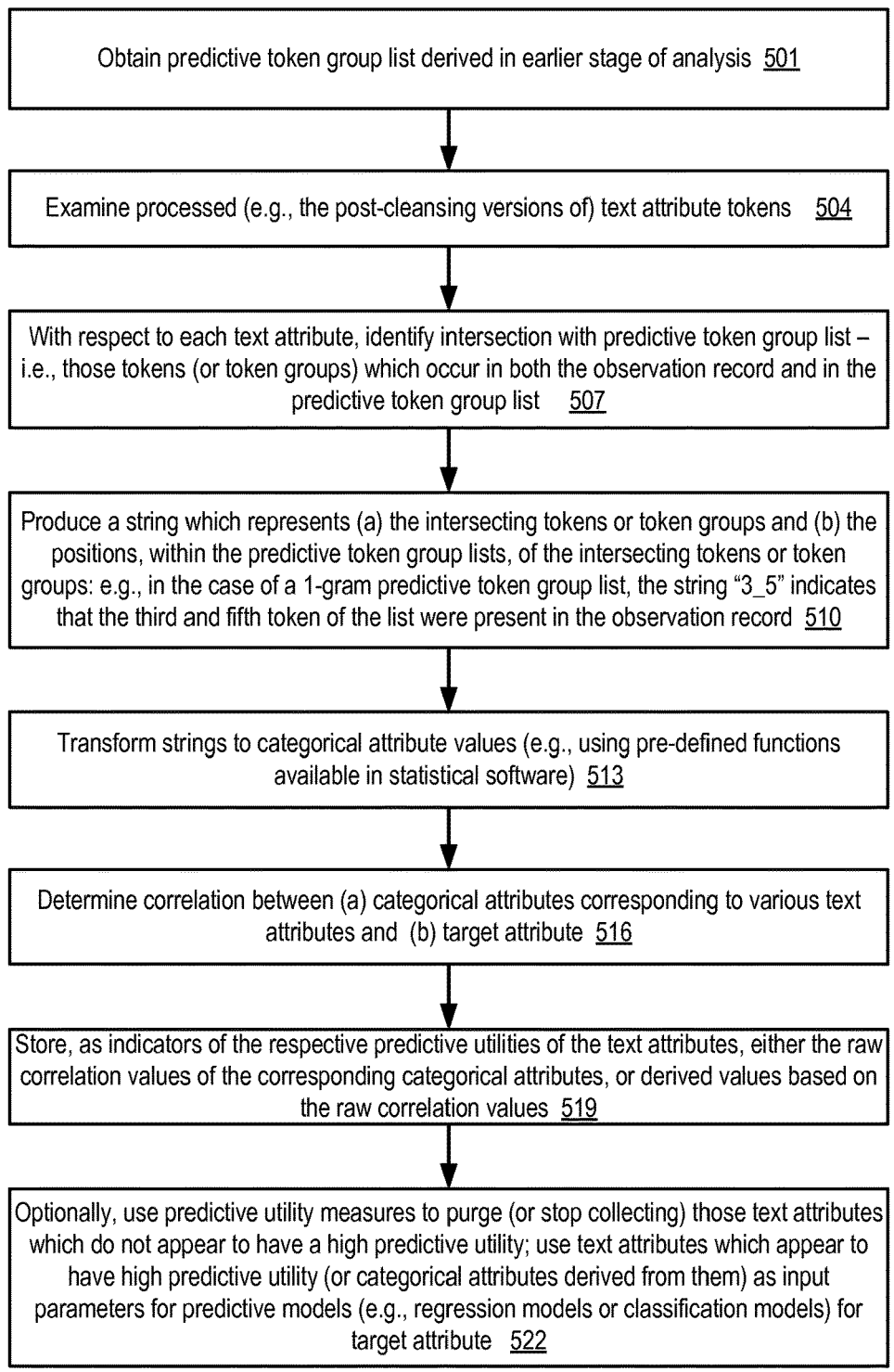
FIG. 5 is a flow diagram illustrating aspects of operations that may be performed to determine respective predictive utility measures for different text attributes using a predictive list of token groups, according to at least some embodiments.

As mentioned earlier, in some embodiments the tokens of text attributes may be combined into larger groups (e.g., groups of two words, or groups of N words) for normalization and predictive utility estimation. In FIG. 4 and FIG. 5, the techniques described with respect to individual tokens or words in the context of FIG. 3 are generalized to cover token groups rather than individual tokens, where each token group may contain one or more tokens. FIG. 4 is a flow diagram illustrating aspects of operations that may be performed to generate a predictive list of token groups corresponding to text attributes of a data set, according to at least some embodiments. The preparation of the predictive token group list may involve a first pass through the observation records of the data set in the depicted embodiment, and the predictive token group list may be used to generate the categorical attribute values in a second pass. As shown in element 401, the raw text of various text attributes may be read in and separated or parsed into individual tokens such as words and punctuation symbols. Optionally, as shown in element 403, the parsed tokens may be cleansed and/or reformatted using any combination of several techniques (element 403), such as punctuation removal, enforcing a single case (e.g., changing all upper-case letters to lower case or vice versa), stemming (reducing derived words to their root or stem form, such as changing both "played" and "playing" to "play"), and/or stop-word elimination (removing common words like "a", "an", "the", etc., which are not expected to be helpful in predicting target attribute values). The types of cleansing operations performed (if any) may depend on the language or script being used for the text attributes—e.g., different techniques may be used for English text than are used for, say, Japanese text.

The number of tokens which are to be considered together as a group, e.g., for correlation determination and predictive token list generation, may be determined for each text attribute, and token groups of the selected size may be identified (element 405). Generally speaking, the tokens of a token group may comprise either consecutive tokens or non-consecutive tokens as they appear in the text attributes—that is, the tokens of a group may occur in any order within the content of a given text attribute. If a token group size of one token is selected, no additional work may be required to identify the token groups, since each token represents a token group. The occurrence counts of the various token groups in the data set may be tracked (element 407)—that is, the tool or service component being used for the analysis may increment the occurrence count for each token group each time the group is encountered.

A metric of the correlation between each token group and the prediction target attribute may be computed (element 410) in the depicted embodiment. The particular correlation metric may be selected based at least in part on the data type of the prediction target attribute: e.g., if the target attribute is a numeric attribute, an adjusted R-squared metric may be used, and if the target attribute is a binary or multi-class categorical attribute, symmetric uncertainty scores may be used. Other metrics indicative of statistical relationships between the token group and the target attribute may be used in various embodiments.

The token groups may be sorted in some embodiments, e.g., in descending order of their correlation metric values (element 413). Those token groups which do not meet a minimum occurrence count threshold may be filtered out in some implementations—for example, in one implementation, unless a token group TG1 is encountered K different times in distinct observation records, where K is a configuration parameter, TG1 may not be included in the sorted token groups even if its correlation with the target attribute is high. Optionally, in some embodiments, the sorted token group list may be pruned (element 416)—e.g., only the token groups with the top 100 correlation scores may be retained, or only the token groups whose correlation measures exceed a threshold may be retained. The remaining sorted token groups for each text attribute may be designated as the predictive token group list for that attribute. The predictive token group lists may be stored in persistent storage in some embodiments (element 419), from where they may be read during the generation of the derived categorical attribute values discussed in the context of FIG. 5.

Deriving Categorical Attribute Values to Determine Predictive Utility

FIG. 5 is a flow diagram illustrating aspects of operations that may be performed to determine respective predictive utility measures for different text attributes using a predictive list of token groups, according to at least some embodiments. In various embodiments, the operations of FIG. 5 may involve a second pass through the data set after at least some of the operations corresponding to FIG. 4 have been performed (or at least a second pass through a cleansed version of the data set, in which the cleansing operations corresponding to element 403 of FIG. 4 have been performed). As shown in element 501, a predictive token group list generated during the earlier phase of the analysis (e.g., in operations corresponding to those illustrated in FIG. 4) may be obtained. The processed or cleansed text tokens of observation record may be examined (element 504). With respect to each text attribute in each observation record, the token groups which are present in both the observation record and the predictive token group list for that text attribute may be identified (element 507).

A representation of the intersection between the predictive token group list and the observation record contents may be generated for each text attribute (element 510). For example, a string which indicates (a) how many matches were found between the predictive token group list for a given text attribute and the observation record's value for that text attribute and/or (b) the ordinal positions of the matching elements in the predictive token group list may be generated. If the size of the token group is one (i.e., if single tokens are being matched), and the third and fifth token of the list are present in the observation record, a string such as "3_5" or "3:5" or "3#5" may be generated in various implementations. If the observation record contained none of the token groups of the predictive token group list, a null string or a string which indicates zero matches may be generated. If string representations of the matching tokens and their positions are used, any desired delimiter (e.g., the underscore "_", colon ":", which separates the ordinal position indicators in the string) may be used in various embodiments. In some embodiments, data types other than strings may be used to represent the intersection between the predictive token group list and the observation records—for example, a function which maps the number and/or ordinal positions of the matching token groups to a numeric value may be used.

The encoded information about the matching tokens or token groups (e.g., the strings or other data types which indicate the number and/or positions of the matching tokens) for a given text attribute may then be converted into a corresponding categorical attribute (element 513). The machine learning service or tool may include various libraries of pre-defined functions which support such string-to-categorical attribute conversion or numeric-to-categorical attribute conversion operations in different embodiments.

After the derived categorical attribute values for a text attribute have been generated for all the observation records, the correlation between the categorical attribute and the target attribute may be determined (element 516). Either the raw correlation value, or a derived representation of the raw correlation value for each categorical attribute (e.g., obtained using a selected transformation function which groups the correlation values into "high", "medium" and "low" correlation buckets) may be stored as respective indications of the predictive utility of the corresponding text attributes (element 519). The predictive utility measures may be provided or displayed via programmatic interfaces to clients in some embodiments. In at least one embodiment, a predictive model (e.g., a regression model or a classification model) for the target attribute may be generated automatically, and the predictive utility measures may be used to select the input variables of the model (element 522). Those text attributes which appear to have low predictive utility may not be considered as useful sources of input data for the model, for example, while the text attributes which have high predictive utility (or the corresponding derived categorical attributes) may be included among input variables of the model. In some embodiments, depending for example on the nature of the data source from which the data set is collected, values of the text attributes with low predictive utility may no longer be collected or stored. The cost of storing and analyzing input data, and/or the cost of training/testing predictive models, may be reduced in various embodiments as a result of eliminating text attributes which are not particularly helpful for accurate prediction of the target attribute.

It is noted that in various embodiments, some of the operations shown in FIG. 2, FIG. 4 or FIG. 5 may be implemented in a different order than that shown in the figure, or may be performed in parallel rather than sequentially. Additionally, some of the operations shown in FIG. 2, FIG. 4 or FIG. 5 may not be required in one or more implementations. For example, in one implementation, one or more of the cleansing operations indicated in FIG. 4 may not be performed. In another implementation, the generation of the derived categorical attribute values for one text attribute may overlap in time with the generation of the predictive token group list for another text attribute.

Bit Vectors

Figure 6:
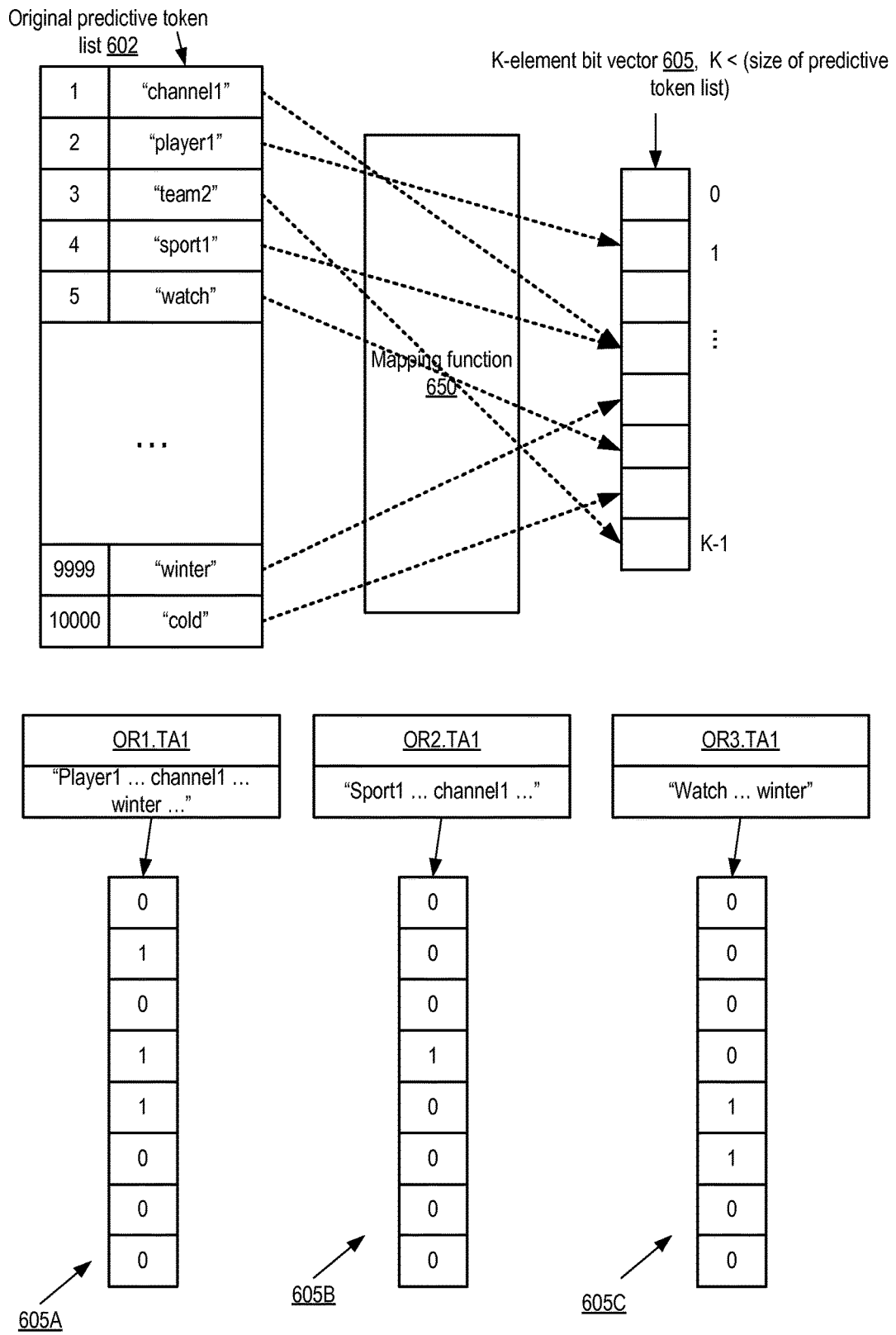
FIG. 6 illustrates an example of a use of bit vector mapping functions during determination of predictive utility of text attributes of a data set, according to at least some embodiments.

In some embodiments, depending on the number of text tokens in the data set and their correlations with the target attribute, the predictive token group list may become quite large, which in turn may lead to derived categorical attributes with very high cardinality. If the number of possible values for a categorical attribute is high, this may in turn lead to difficulties and/or poor performance in computing correlations with the target attribute. A technique in which the elements of the predictive token group list are mapped to a bit vector of a selected small size may help alleviate the problem of high-cardinality categorical attributes. FIG. 6 illustrates an example of a use of bit vector mapping functions during determination of predictive utility of text attributes of a data set, according to at least some embodiments. To simplify the presentation, a token group size of one is used in FIG. 6. The original predictive token group list 602 produced after the first phase of analysis (e.g., in operations corresponding to those shown in FIG. 4) for a given text attribute includes 10000 tokens in the scenario depicted in FIG. 6.

The size of a bit vector to be used to represent the matching tokens of various observation records may be selected by the machine learning service or tool, e.g., based on heuristics or based on contents of a knowledge base which indicates how well different sizes of bit vectors have worked for other data sets in the past. The number of bits K of bit vector 605 may typically be set smaller than the number of elements in the original predictive token list 602. A mapping function 650 (e.g., a hash function with the appropriate statistical properties) may be selected to determine, for a given set of tokens which are present in both the original predictive token list 602 and in an observation record, the indexes of bit vector 605 which should be set to generate the categorical attribute value for the text attribute and the observation record. In the depicted example, if either the word "channel1" or the word "sport1" is present in the observation record, the $4^{th}$ bit (the bit at index 3 of the bit vector) may be set, if the word "player1" is present, the $2^{nd}$ bit (the bit at index 1) may be set, and so on.

Three bit vectors 605A, 605B and 605C with size K set to 8 are shown, corresponding to the respective content of attribute TA1 for observation records OR1, OR2 and OR3. Only those tokens in the observation records OR1-OR3 which match tokens in the original token group list 602 are shown in FIG. 6. OR1's TA1 value contains the matching tokens "player1", "channel1" and "winter", so the bits at indexes 1, 3 and 4 are set, resulting in a categorical attribute value of 01011000 for the (OR1.TA1) combination. OR2 contains the tokens "sport1" and "channel1", so the bit vector 605B is set to 00010000, with the bit at index 3 set for both "channel1" and "sport1". OR3 contains the tokens "winter" and "watch", so the bits at indexes 4 and 5 are set, resulting in the categorical attribute value 00001100.

As indicated by the use of the $4^{th}$ bit for representing both "channel1" and "sport1", the same bit index may be used for multiple tokens or token groups in at least some embodiments. While this type of collision may of course lead to some loss of information when the correlation between the categorical attributes (based on the bit vectors) and the target attribute is computed, the benefits of reducing the cardinality of the categorical variable may outweigh the loss of information in at least some embodiments. In at least, the size of the bit vector may be adjusted based on the quality of the results obtained—e.g., if the use of 24-bit vectors does not lead to predictions at a desired level of accuracy from a model, 48-bit vectors may be used, and so on.

Example Machine Learning Service Architecture

Figure 7:
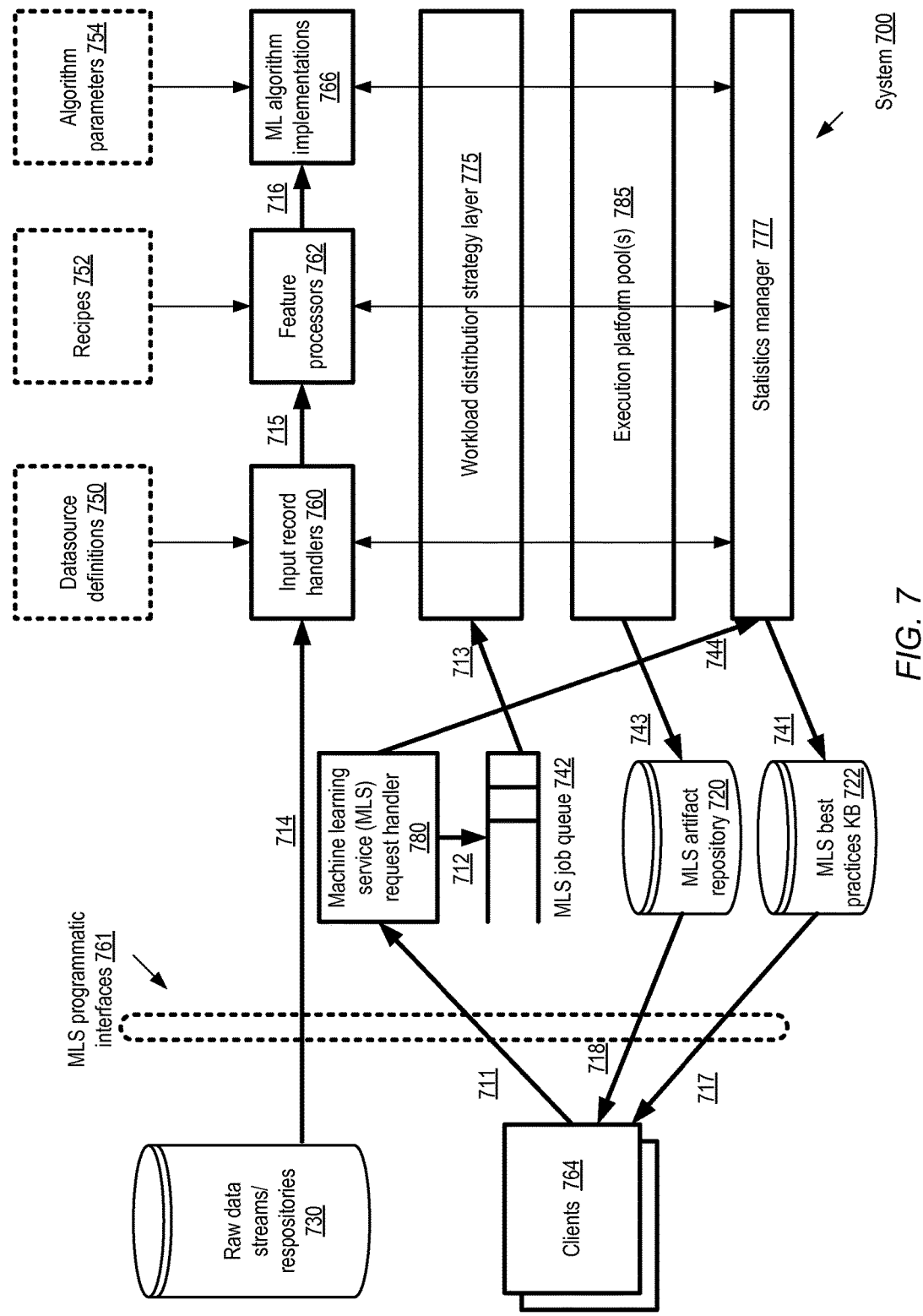
FIG. 7 illustrates an example machine learning service at which correlation-based categorical variables may be derived from text attributes of various data, according to at least some embodiments.

FIG. 7 illustrates an example machine learning service at which correlation-based categorical variables may be derived from text attributes of various data, according to at least some embodiments. In system 700 of FIG. 7, the machine learning service (MLS) may include a plurality of computation engines organized into one or more execution platform pools 785. Selected execution platforms of pools 785 may be used, for example, to examine text attributes of input data sets to produce corresponding derived categorical attributes and predictive utility metrics using the algorithms described above. In the depicted embodiment, the MLS may include a statistics manager component 777 responsible for coordinating the implementation of the normalization algorithm for various data sets of different clients. The statistics manager may also be referred to as an insights manager in some environment, as it may be responsible for performing various computations to provide a clearer understanding of the content of various data sets to clients 764.

Data sets (or pointers to sources of the data sets) to be analyzed and used for training various models may be received at the MLS via programmatic interfaces 761 from various MLS clients 764 in the depicted embodiment. Any of a variety of programmatic interfaces may be used in different embodiments, such as APIs, command-line tools, web pages, or standalone GUIs. In general, the programmatic interfaces 761 may also be used by the clients to submit requests 711 for a variety of machine learning-related tasks or operations. The administrative or control plane portion of the MLS may include MLS request handler 780, which accepts the client requests 711 and inserts corresponding job objects into MLS job queue 742, as indicated by arrow 712. In general, the control plane of the MLS may comprise a plurality of components (including the request handler, workload distribution strategy selectors, one or more job schedulers, metrics collectors, and/or modules that act as interfaces with other services). The data plane of the MLS may include, for example, at least a subset of the servers of pool(s) 785, storage devices that are used to store input data sets including training, test or evaluation data, intermediate results (such as the predictive token lists or predictive token group lists discussed earlier) or final results, and the network pathways used for transferring client input data and results.

Client-submitted requests for various types of machine learning tasks, such as requests to normalize text attributes of data sets, may each be translated into one or more units of work called "jobs" in the depicted embodiment, with corresponding job objects being generated and stored in the job queue 742. In some embodiments, data set normalization requests submitted via interfaces 761 may include, for example, parameters indicating the specific text attributes for which normalization is desired. In at least one embodiment a normalization request submitted by a client may first be analyzed by statistics manager 777, as indicated by arrow 744, and the statistics manager may prepare the actual job requests. In one embodiment, a normalization request may indicate one or more constraints or preferences which may be taken into account by the statistics manager 777. For example, a client may indicate a budget limit, a resource limit, and/or a time limit, and the statistics manager 777 may use such constraints to select tunable parameters (such as the correlation thresholds used to trim predictive token group lists, the occurrence count thresholds used to eliminate tokens, the sizes of bit vectors, etc.).

Jobs may be removed from job queue 742 by a component of a workload distribution strategy layer 775, as indicated by arrow 713, and a processing plan may be identified for each such job. The workload distribution strategy layer 775 may determine the manner in which the lower level operations of the job are to be distributed among one or more computation engines selected from pool 785, and/or the manner in which the data analyzed or manipulated for the job is to be distributed among one or more storage devices or servers. After the processing plan has been generated and the appropriate set of resources to be utilized for the job has been identified, the job's operations may be scheduled on the resources. Results of some jobs (e.g., predictive utility measures, trained models or the like) may be stored as MLS artifacts within artifact repository 720 in some embodiments, as indicated by arrow 743.

For various types of machine learning tasks, a client request 711 may indicate parameters that may be used by the MLS to perform the tasks, such as a data source definition (which may indicate a source for a training data set), a feature processing transformation recipe, or parameters to be used for a particular machine learning algorithm. Some machine learning workflows, which may correspond to a sequence of API requests from a client 764, may include the extraction and cleansing of input data records from raw data repositories or stream sources 730 (e.g., repositories indicated in data source definitions 750) by input record handlers 760 of the MLS, as indicated by arrow 714. For example, the different types of text cleansing operations which may be employed during phases of text attribute normalization discussed earlier, such as stemming, stop word removal and the like, may be performed by input record handlers 760 in some embodiments. In various embodiments, the input data reaching the MLS may be encrypted or compressed, and the MLS input data handling machinery may have to perform decryption or decompression before the input data records can be used for training or other machine learning tasks. For some types of machine learning requests, the output produced by the input record handlers may be fed to feature processors 762 (as indicated by arrow 715), where a set of transformation operations may be performed in accordance with various transformation recipes 752, e.g., using another set of resources from pool 785. A transformation recipe 752 may indicate, for example, various kinds of transformation or aggregation operations, and may be formatted in a recipe language defined for the machine learning service. The generation of the categorical attributes used for determining predictive utility measures may be considered one example of feature processing in the depicted embodiment. The output 716 of the feature processing transformations may in turn be used as input for a selected machine learning algorithm 766 (with corresponding algorithm parameters 754), which may be executed using yet another set of resources from pool 785. A wide variety of machine learning algorithms may be supported natively by the MLS, including for example regression algorithms, classification algorithms (such as random forest algorithms), neural network algorithms, and the like. In at least one embodiment, the MLS may be designed to be extensible—e.g., clients may provide or register their own modules (which may be specified as user-defined functions) for input record handling, feature processing, or for implementing additional machine learning algorithms than are supported natively by the MLS.

In the embodiment depicted in FIG. 7, the MLS may maintain knowledge base 722 containing information on best practices for various tasks, including for example the kinds of text attribute normalization techniques described earlier. Such knowledge base entries may be used, for example, to select tunable parameter settings for various phases of the text attribute processing, such as the size of token groups, the thresholds used for including tokens or token groups within prediction lists, whether bit vectors should be used or not, the sizes of the bit vectors to use, and/or the particular metrics to be used as correlation measures. Entries may be added into the best practices KB 722 by various control-plane components of the MLS including the statistics manager 777 (as indicated by arrow 741), e.g., based on results of earlier operations, client feedback, and so on. In at least some embodiments, clients 764 may access at least some of the contents of the KB 722 and/or the MLS artifact repository 720 using programmatic interfaces 761, as indicated by arrows 717 and 718. In the depicted embodiment, the MLS artifact repository 720 may also store the predictive models whose input parameters are selected using the normalization algorithms described. It is noted that the algorithms for determining or estimating predictive utility described herein may be employed in at least some embodiments without using MLS resources—that is, the existence or availability of a machine learning service is not a requirement for estimating predictive utility.

Example Web-Based Interface

FIG. 8 illustrates an example programmatic interface which may be used to indicate predictive utilities of text attributes to clients, according to at least some embodiments. In the depicted embodiment, the programmatic interface comprises web page 800 with a message area 805, a predictive utility score table 807, and elements 809 and 811 which provide details about selected text attributes of a client's data set.

Message area 805 may provide a description of the contents of table 807. The particular data set for which the predictive utilities have been generated may be indicated in message area 805. The number of observation records analyzed may also be displayed in some implementations. A high-level explanation of the concept of predictive utility may be provided, together with an indication of the prediction target attribute and a link which can be used by a client to obtain more details about how the predictive utility scores were computed.

Respective predictive utility scores for five different text attributes (social media status update SMSU1, social media comment SMC1, text message TM1, email-to-friend EM1 and email-to-family EM2) are shown in descending order in table 807. Region 811 indicate the particular text tokens of one of the text attributes (SMSU1) which had the highest correlations with the target attribute, and message area 809 indicates how a client may obtain a list of high-correlation tokens for other attributes. In some implementations, the value of the correlation metrics for the different tokens may be indicated via web page 800. In various embodiments, interfaces other than web pages, such as APIs (application programming interfaces), command-line tools, or graphical user interfaces may be used to provide similar types of information regarding text attributes and predictive utility to clients.

Normalizing Non-Text Attributes

Figure 9:
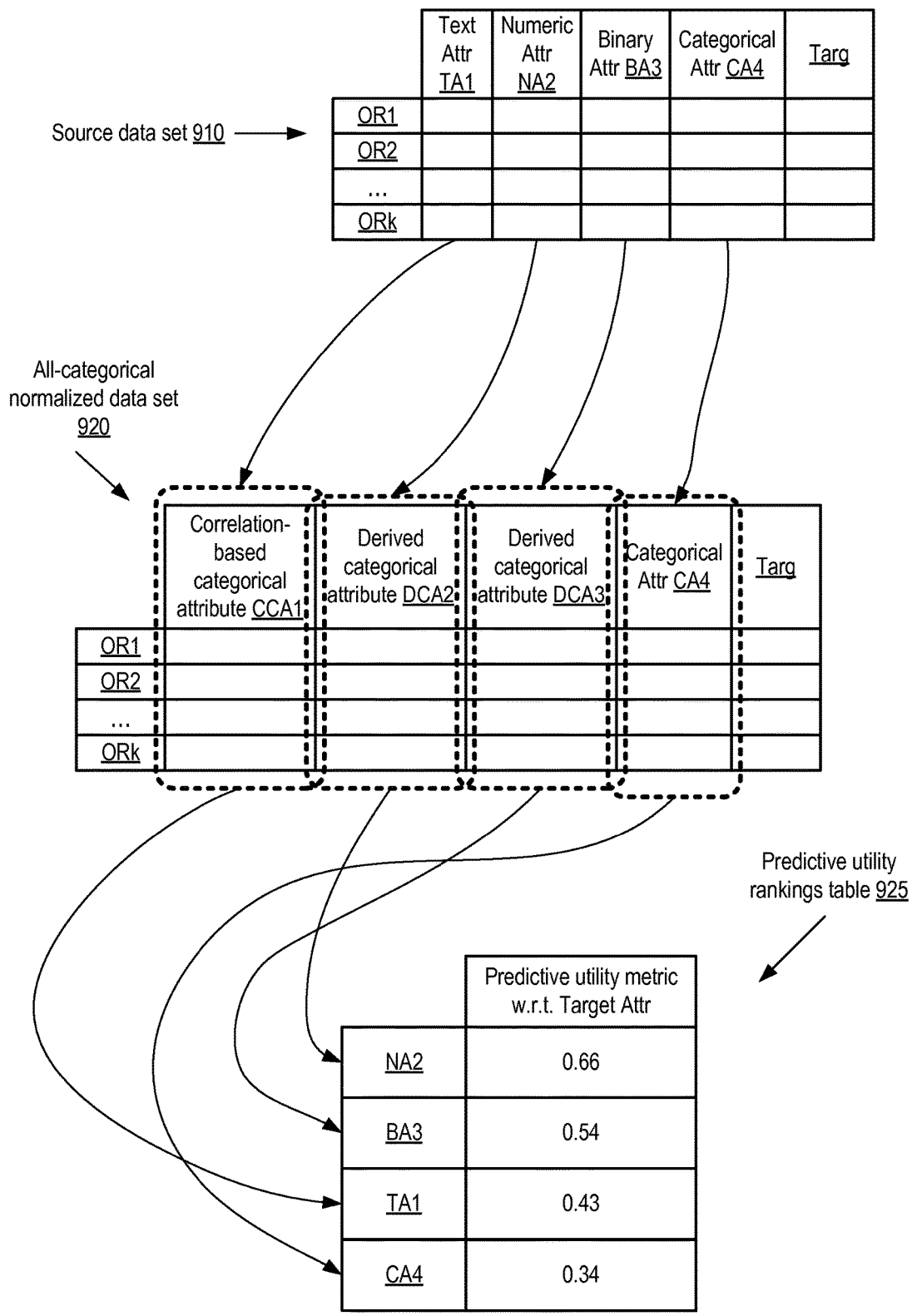
FIG. 9 illustrates a technique in which non-text attributes of a data set may be normalized to categorical attributes prior to determining relative predictive utilities, according to at least some embodiments.

As mentioned earlier, in some embodiments categorical attributes may be derived from numeric and binary attributes of various data sets, e.g., in addition to or instead of generating categorical attributes from just the text attributes. FIG. 9 illustrates a technique in which non-text attributes of a data set may be normalized to categorical attributes prior to determining relative predictive utilities, according to at least some embodiments. The observation records OR1, OR2, ORk of a source data set 910 of FIG. 9 each include respective values for a text attribute TA1, a numeric attribute NA2, a binary attribute BA3, a categorical attribute CA4, and a target attribute Targ.

An all-categorical normalized data set 920 may be generated from source data set 910 in the depicted embodiment. In the normalized data set 920, respective values of a correlation-based categorical attribute CCA1 corresponding to TA1 may be generated for each observation record using the algorithms described earlier, e.g., by first identifying a predictive token list or predictive token group list and then producing a representation of the matching tokens present in each observation record. The values for the original categorical attribute CA4 may be retained unchanged in the normalized data set 920. Respective derived categorical attributes DCA2 and DCA3 may be generated from values of the numeric attribute NA2 and the binary attribute BA3 and included in the normalized data set 920. After all the different types of non-target attributes of the original data set 910 which were not categorical to begin with have been normalized into respective categorical attributes, the respective predictive utilities for each of the attributes with respect to the target attribute Targ may be obtained, e.g., based at least in part on correlation metrics such as symmetric uncertainty scores or adjusted R-squared values calculated for the categorical attributes and Targ. In some implementations, the correlation values may be used without modification as the predictive utility metrics, while in other implementations selected transformation functions may be applied to the correlation values to obtain the predictive utility measures. Rankings table 925 shows the four non-target attributes ranked in descending order of predictive utility. One advantage of generating derived categorical attribute values for each non-categorical and non-target attribute of the original data set is that the same types of mathematical functions may then be applied to determine correlations or other statistical relationships between all the attributes and the target attribute. As a result, at least some of the distortions which may otherwise arise in comparing the predictive usefulness of different attributes (e.g., due to the fact that different mathematical techniques may be used for computing correlations of the target attribute with different attribute types) may be avoided in the depicted embodiment.

In various embodiments, the end results of the predictive utility determination procedure illustrated in FIG. 9 may be provided programmatically to clients or data scientists in various embodiments, and/or used for determining input variables to be used for training predictive models. Based on the results shown in table 925, for example, a data scientist may decide that the input variables of a regression or classification model for predicting Targ need not include CA4 (which has the lowest predictive utility shown in the table), but should include the other three attributes (or categorical attributes derived from the other three attributes).

Use Cases

The techniques described above, of determining the relative utility of different text attributes of a data set with respect to being able to make accurate predictions regarding a prediction target attribute, may be useful in a variety of environments. Many problem domains being addressed using machine learning, including, for example, so-called deep learning applications, national security-related applications, and the like may require analysis of millions of observation records, each of which in turn may include thousands of text tokens distributed among numerous text attributes. Large and larger fractions of the raw data collected for such problem domains may comprise text, especially as the use of text-oriented social media applications and messaging applications increases. Retaining the entire corpus of text tokens, and trying to identify correlations between individual tokens and the target attribute, may require very large allocations of resources, and may not result in models that provide desired levels of prediction accuracy. The algorithms used to systematically distinguish between more valuable (from a prediction accuracy perspective) and less valuable text attributes may help lower the costs of generating accurate predictive models. In addition, the predictive accuracy of the models may be increased (e.g., by avoiding overfitting-related problems), and the runtime performance of the models may be enhanced (e.g., by reducing memory footprints). Even in cases where models are not generated automatically by the machine learning system, the predictive utility measures generated using the described algorithms may help data set owners and analysts to gain greater insights into the data, which in turn may lead to improvements and efficiencies in the way that the data sets are collected and stored.

Illustrative Computer System

Figure 10:
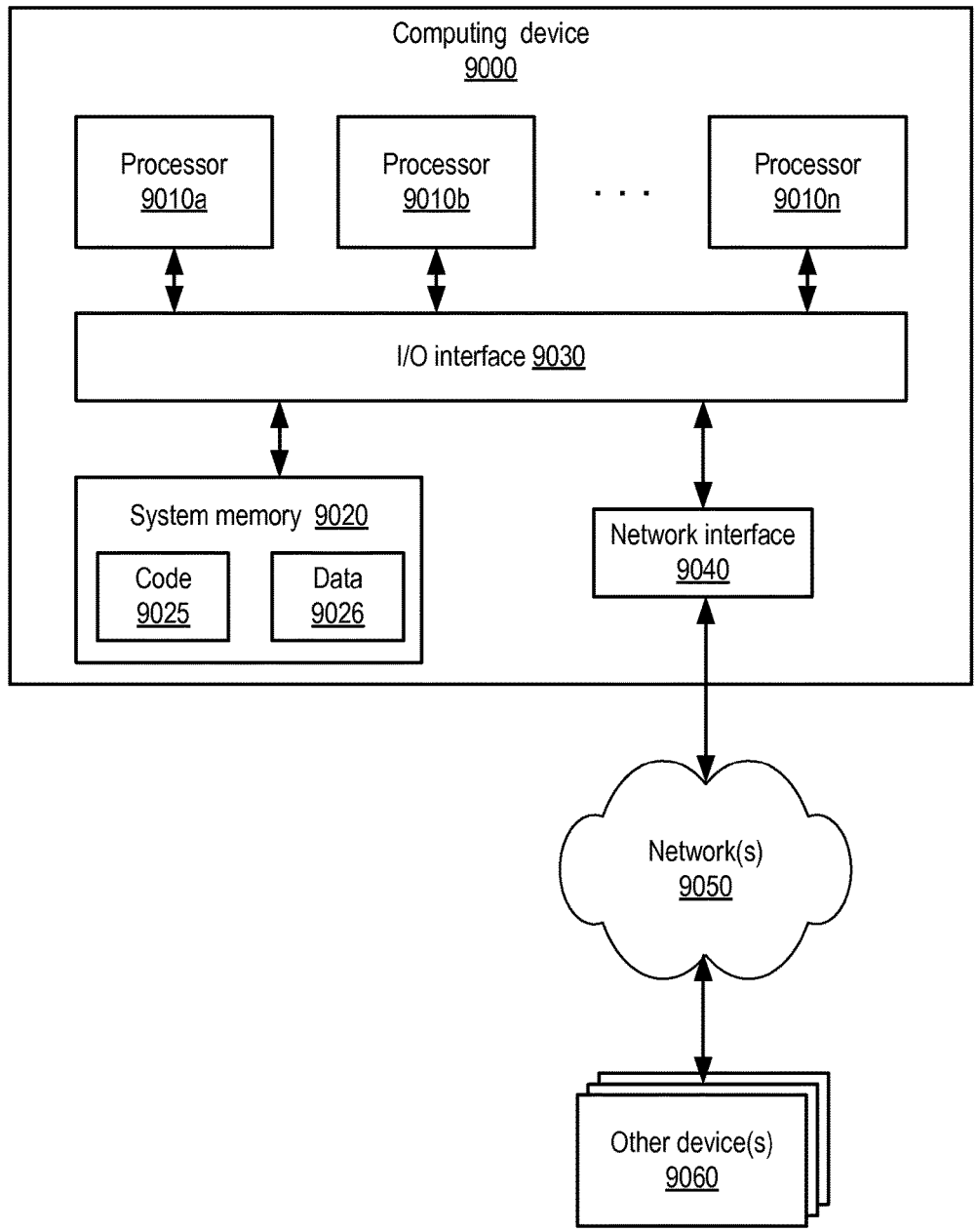
FIG. 10 is a block diagram illustrating an example computing device that may be used in at least some embodiments.

In at least some embodiments, a server that implements one or more of the techniques described above for obtaining predictive utility indicators (including for example statistics managers and other components of a machine learning service, or servers at which standalone tools used for analyzing data sets are implemented) may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices of a machine learning service implemented at a provider network;
   wherein the one or more computing devices are configured to:
      identify a plurality of attributes of a source data set for which respective measures of predictive utility with respect to a prediction target attribute are to be obtained, wherein the plurality of attributes include at least a first text attribute, and wherein the source data set comprises a plurality of observation records;
      in a first analysis pass through the source data set,
         compute, for individual ones of a plurality of text tokens of the first text attribute present in the source data set, a respective first correlation metric between the text token and the prediction target attribute;
         generate, based at least in part on (a) the respective first correlation metrics and (b) a respective occurrence count of the individual ones of the text tokens in the source data set, a predictive token list comprising one or more text tokens of the plurality of text tokens;
      in a second analysis pass through the source data set,
         generate, corresponding to the first text attribute, a respective value of a first categorical attribute for individual ones of the plurality of observation records, wherein the value of first categorical attribute for a particular observation record is based at least in part on determining whether a particular text token of the predictive token list is present in the first text attribute of the particular observation record; and
         compute, with respect to the plurality of observation records, a second correlation metric between the first categorical attribute and the target attribute; and store, as an indication of predictive utility of the first text attribute with respect to the target attribute, a value based at least in part on the second correlation metric.

2. The system as recited in claim 1, wherein the one or more computing devices are configured to:
   select, based at least in part on the second correlation metric, the first categorical attribute as an input variable of a predictive machine learning model;
   identify a training data set for the predictive machine learning model, wherein the training data set includes at least one observation record which is not present in the source data set;
   train the predictive machine learning model using the training data set; and
   obtain one or more predictions for the prediction target attribute using the predictive machine learning model.

3. The system as recited in claim 1, wherein to generate the predictive token list, the one or more computing devices are configured to sort the one or more text tokens in decreasing order of the first correlation metric.

4. The system as recited in claim 1, wherein the value of the first categorical attribute for the particular observation record indicates the number of text tokens of the predictive token list which are present in the first text attribute of the particular observation record.

5. The system as recited in claim 1, wherein the value of the first categorical attribute for the particular observation record indicates: (a) that the particular text token is present in the first text attribute of the particular observation record, (b) that a second text token of the predictive token list is present in the first text attribute of the particular observation record, and (c) that the first correlation metric of the particular text token differs from the first correlation metric of the second text token.

6. A method, comprising:
   performing, by one or more computing devices:
   determining, for individual ones of a plurality of text token groups of a first text attribute present in a source data set, a respective first correlation metric between the text token group and a prediction target attribute, wherein the text token group comprises one or more text tokens;
   generating, based at least in part on the respective first correlation metrics, a predictive token group list comprising one or more text token groups of the plurality of text token groups;
   determining, corresponding to the first text attribute, a respective value of a first categorical attribute for individual ones of a plurality of observation records of the source data set, wherein the value of the first categorical attribute for a particular observation record is based at least in part on determining that a particular text token group of the predictive token group list is present in the first text attribute of the particular observation record;
   computing, with respect to the plurality of observation records, a second correlation metric between the first categorical attribute and the target attribute; and
   storing, as an indication of predictive utility of the first text attribute with respect to the target attribute, a value based at least in part on the second correlation metric.

7. The method as recited in claim 6, wherein said generating the predictive token group list comprises:
   including a particular text token group of the plurality of text token groups in the predictive token group list based at least in part on determining that an occurrence count of the particular text token group in the source data set meets a threshold criterion.

8. The method as recited in claim 6, wherein said generating the predictive token group list comprises sorting the one or more text token groups of the predictive token group list based at least in part on the respective first correlation metrics of the one or more text token groups.

9. The method as recited in claim 6, wherein the value of the first categorical attribute for the particular observation record indicates the number of text token groups of the predictive token group list which are present in the first text attribute of the particular observation record.

10. The method as recited in claim 6, wherein the value of the first categorical attribute for the particular observation record indicates: (a) that the particular text token group is present in the first text attribute of the particular observation record, (b) that a second text token group of the predictive token group list is present in the first text attribute of the particular observation record, and (c) that the first correlation metric of the particular text token group exceeds the first correlation metric of the second text token group.

11. The method as recited in claim 6, wherein the value of the first categorical attribute for the particular observation record indicates: (a) that the particular text token group is present in the first text attribute of the particular observation record and (b) an ordinal position of the particular text token group in the predictive token group list.

12. The method as recited in claim 6, further comprising performing, by the one or more computing devices:
   selecting, based at least in part on the second correlation metric, the first categorical attribute as an input variable of a predictive machine learning model;
   training the predictive machine learning model; and
   obtaining one or more predictions for the target attribute using the predictive machine learning model.

13. The method as recited in claim 6, further comprising performing, by the one or more computing devices:
   generating, corresponding to a first non-text attribute included in individual ones of the plurality of observation records, a respective value of a second categorical attribute for individual ones of the plurality of observation records;
   computing, with respect to the plurality of observation records, a third correlation metric between the second categorical attribute and the target attribute; and
   determining, based at least in part on a comparison of the third correlation metric and the second correlation metric, that (a) the first categorical attribute is to be used as an input variable of a predictive machine learning model, and (b) that the second categorical attribute is not to be used as an input variable of the predictive machine learning model.

14. The method as recited in claim 6, further comprising performing, by the one or more computing devices:
   identifying a function to map individual text token groups of the predictive token group list to respective bit positions of a bit array of a selected length, wherein said determining the value of the first categorical attribute comprises utilizing the function to map the particular text token group to a particular bit position of a particular bit array of the selected length.

15. The method as recited in claim 6, further comprising performing, by the one or more computing devices:

indicating, via one or more programmatic interfaces, respective measures of predictive utility of a plurality of attributes of the data set including the first text attribute.

16. A non-transitory computer-accessible storage medium storing program instructions that when executed on one or more processors:
compute, with respect to individual ones of a plurality of text token groups of a first text attribute present in a source data set, a respective first metric indicative of a statistical relationship between the text token group and a target attribute of the source data set, wherein the source data set includes a plurality of observation records;
generate, based at least in part on the respective first metrics, a predictive token group list comprising one or more text token groups of the plurality of text tokens;
determine, corresponding to the first text attribute, a respective value of a first categorical attribute for individual ones of the plurality of observation records, wherein the value of the first categorical attribute for a particular observation record is based at least in part on determining that a particular text token group of the predictive token group list is present in the first text attribute of the particular observation record;
compute, with respect to the plurality of observation records, a second metric indicative of a statistical relationship between the first categorical attribute and the target attribute; and
store, as a measure of predictive utility of the first text attribute with respect to the target attribute, the second metric.

17. The non-transitory computer-accessible storage medium as recited in claim 16, wherein to generate the predictive token group list, the instructions when executed on the one or more processors:
exclude a first text token group of the plurality of text token groups from the predictive token group list based at least in part on determining that an occurrence count of the first text token group in the source data set meets a threshold criterion.

18. The non-transitory computer-accessible storage medium as recited in claim 16, wherein the instructions when executed on the one or more processors:
indicate, to a client via one or more programmatic interfaces, one or more text token groups of the predictive token group list.

19. The non-transitory computer-accessible storage medium as recited in claim 16, wherein the respective first metric indicative of the statistical relationship between the text token group and the target attribute of the source data set comprises one or more of: (a) a symmetric uncertainty score, or (b) an adjusted R-squared value.

20. The non-transitory computer-accessible storage medium as recited in claim 16, wherein the instructions when implemented on the one or more processors:
select, based at least in part on the second metric, the first categorical attribute as an input variable to be used to train a predictive model, wherein the predictive model comprises one or more of: (a) a regression model, (b) a binary classification model, or (c) a multi-class classification model.

* * * * *